US012567982B2

(12) United States Patent
Noce et al.

(10) Patent No.: US 12,567,982 B2
(45) Date of Patent: Mar. 3, 2026

(54) REMOTE ACCESS VIA SYSTEM-LEVEL TRUSTED AUTHORITIES

(71) Applicant: ASSA ABLOY AB, Stockholm (SE)

(72) Inventors: Pasquale Noce, Naples (IT); Martin Kaufmann, Graz (AT)

(73) Assignee: ASSA ABLOY AB, Stockholm (SE)

( * ) Notice: Subject to any disclaimer, the term of this patent is extended or adjusted under 35 U.S.C. 154(b) by 80 days.

(21) Appl. No.: 18/483,101

(22) Filed: Oct. 9, 2023

(65) Prior Publication Data

US 2024/0129138 A1      Apr. 18, 2024

Related U.S. Application Data

(60) Provisional application No. 63/379,505, filed on Oct. 14, 2022.

(51) Int. Cl.
*H04L 9/32* (2006.01)
*H04L 9/30* (2006.01)
*H04L 9/40* (2022.01)

(52) U.S. Cl.
CPC .......... *H04L 9/3268* (2013.01); *H04L 9/3073* (2013.01); *H04L 63/105* (2013.01)

(58) Field of Classification Search
None
See application file for complete search history.

(56) References Cited

U.S. PATENT DOCUMENTS

| | | | |
|---|---|---|---|
| 9,230,375 B2 | 1/2016 | Micali et al. | |
| 10,169,587 B1 | 1/2019 | Nix | |

| | | | | |
|---|---|---|---|---|
| 10,462,114 B2 | 10/2019 | Poffenbarger | | |
| 10,855,440 B1 | 12/2020 | Alwen et al. | | |
| 11,546,142 B1 | 1/2023 | Sinchev et al. | | |
| 2003/0061512 A1* | 3/2003 | Flurry | ................. | H04L 63/0815 |
| | | | | 726/4 |
| 2009/0313684 A1* | 12/2009 | Shah | ....................... | H04L 63/08 |
| | | | | 726/28 |
| 2013/0136255 A1 | 5/2013 | Brown | | |

(Continued)

FOREIGN PATENT DOCUMENTS

| | | |
|---|---|---|
| CN | 107978047 | 5/2018 |
| CN | 114241631 | 3/2022 |

(Continued)

OTHER PUBLICATIONS

"European Application Serial No. 23198922.9, Response Filed Jul. 31, 2024 to Extended European Search Report mailed Feb. 6, 2024", 81 pages.

(Continued)

*Primary Examiner* — William J. Goodchild
(74) *Attorney, Agent, or Firm* — Schwegman Lundberg & Woessner, P.A.

(57) ABSTRACT

Methods and systems for establishing a system specific trust system are provided. The methods and systems establish a secure channel between a first device and a second device using a system specific trusted authority. The methods and systems determine, by the first device, using a first certificate associated with the second device, a first set of access rights of the second device and determine, by the second device, using a credential associated with the first device, a second set of access rights of the first device.

19 Claims, 5 Drawing Sheets

(56) References Cited

U.S. PATENT DOCUMENTS

| | | | |
|---|---|---|---|
| 2014/0211938 | A1 | 7/2014 | Campagna |
| 2015/0229473 | A1 | 8/2015 | Klein et al. |
| 2015/0372811 | A1 | 12/2015 | Le Saint et al. |
| 2016/0099814 | A1 | 4/2016 | Negi et al. |
| 2018/0351941 | A1* | 12/2018 | Chhabra .................. H04L 63/08 |
| 2018/0375663 | A1 | 12/2018 | Le Saint et al. |
| 2020/0021588 | A1 | 1/2020 | Wittrock et al. |
| 2020/0186367 | A1 | 6/2020 | Yang et al. |
| 2020/0213111 | A1 | 7/2020 | Leavy et al. |
| 2021/0153010 | A1 | 5/2021 | Torvinen et al. |
| 2022/0272534 | A1 | 8/2022 | Torvinen et al. |

FOREIGN PATENT DOCUMENTS

| | | |
|---|---|---|
| EP | 2363976 | 9/2011 |
| EP | 2493112 | 8/2012 |
| EP | 3694141 | 8/2020 |
| WO | 2022000023 | 1/2022 |

OTHER PUBLICATIONS

"European Application Serial No. 23198928.6, Response Filed Jul. 31, 2024 to Extended European Search Report mailed Feb. 12, 2024", 83 pages.

"European Application Serial No. 23198910.4, Response Filed Aug. 1, 2024 Extended European Search Report mailed Nov. 13, 2023", 11 pages.

"European Application Serial No. 23198910.4, Response filed Mar. 25, 2025 to Communication Pursuant to Article 94(3) EPC mailed Feb. 20, 2025", 13 pages.

U.S. Appl. No. 18/467,905, filed Sep. 15, 2023, Non-Repudiation-Free Public Key Authentication Protocols.

U.S. Appl. No. 18/468,131, filed Sep. 15, 2023, User Credentials Protecting From Swapping Attacks.

U.S. Appl. No. 18/468,167, filed Sep. 15, 2023, Privacy-Strengthened Public Key Authentication Protocols.

"European Application Serial No. 23203049.4, Response Filed Mar. 22, 2024 to Extended European Search Report mailed Mar. 11, 2024", 2 pgs.

"European Application Serial No. 23198910.4, Communication Pursuant to Article 94(3) EPC mailed Feb. 20, 2025", 4 pages.

"European Application Serial No. 23198910.4, Extended European Search Report mailed Nov. 13, 2023", 7 pgs.

"European Application Serial No. 23198922.9, Extended European Search Report mailed Feb. 6, 2024", 8 pgs.

"European Application Serial No. 23198928.6, Extended European Search Report mailed Feb. 12, 2024", 8 pgs.

"European Application Serial No. 23203049.4, Extended European Search Report mailed Mar. 11, 2024", 7 pgs.

"European Application Serial No. 23198910.4, Communication Pursuant to Article 94(3) EPC mailed Apr. 11, 2025", 4 pages.

"European Application Serial No. 23198910.4, Response filed Jul. 21, 2025 to Communication Pursuant to Article 94(3) EPC mailed Apr. 11, 2025", 13 pgs.

"U.S. Appl. No. 18/467,905, Response filed Oct. 8, 2025 to Non Final Office Action mailed Aug. 20, 2025", 9 pgs.

"U.S. Appl. No. 18/468,167, Response filed Oct. 8, 2025 to Non Final Office Action mailed Jul. 30, 2025", 9 pgs.

"U.S. Appl. No. 18/468,167, Non Final Office Action mailed Jul. 30, 2025", 19 pages.

"U.S. Appl. No. 18/467,905, Non Final Office Action mailed Aug. 20, 2025", 37 pages.

"European Application Serial No. 23203049.4, Communication Pursuant to Article 94(3) EPC mailed Sep. 10, 2025", 4 pages.

* cited by examiner

100

110

Access Control
Device(s)

120

Client Device

130

Network

140

SERVER/CONTROLLER

142

Authorization
System

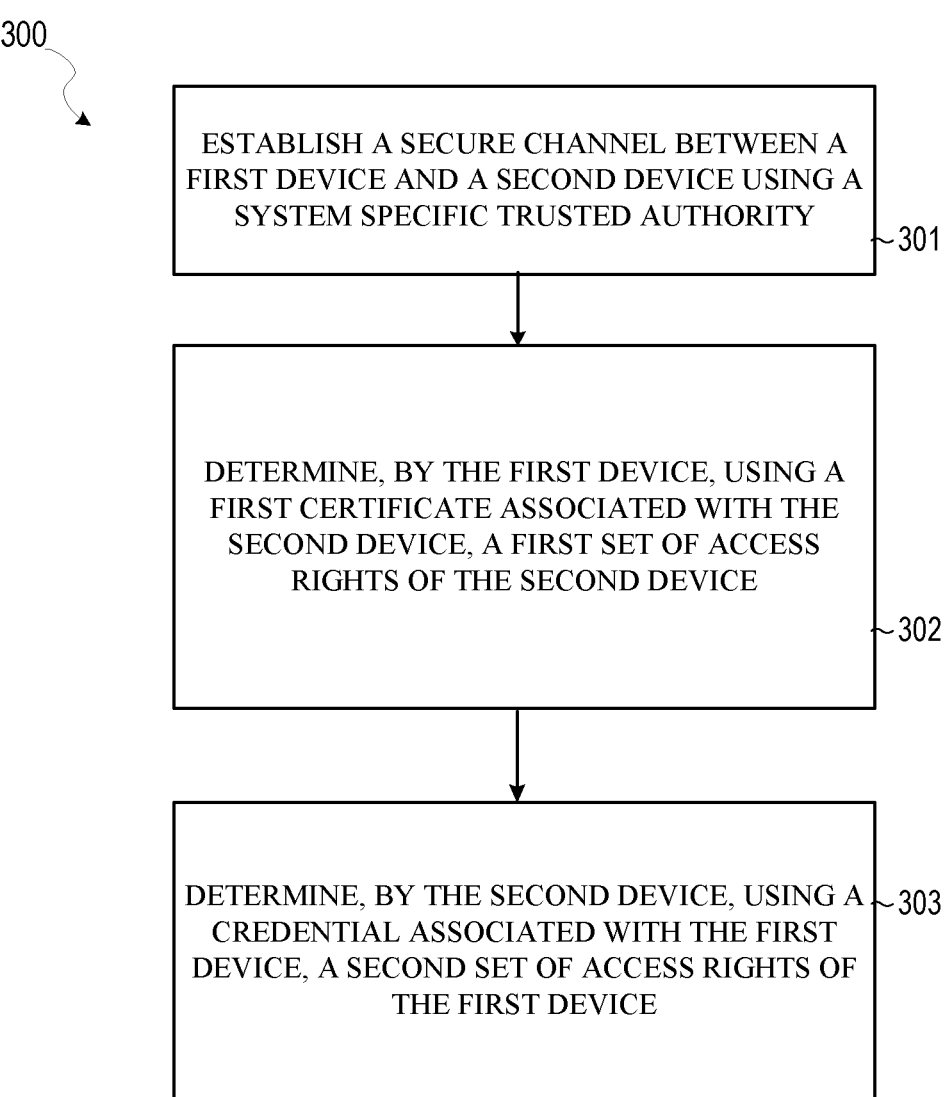

300

ESTABLISH A SECURE CHANNEL BETWEEN A FIRST DEVICE AND A SECOND DEVICE USING A SYSTEM SPECIFIC TRUSTED AUTHORITY ～301

DETERMINE, BY THE FIRST DEVICE, USING A FIRST CERTIFICATE ASSOCIATED WITH THE SECOND DEVICE, A FIRST SET OF ACCESS RIGHTS OF THE SECOND DEVICE ～302

DETERMINE, BY THE SECOND DEVICE, USING A ～303 CREDENTIAL ASSOCIATED WITH THE FIRST DEVICE, A SECOND SET OF ACCESS RIGHTS OF THE FIRST DEVICE

*FIG. 3*

REMOTE ACCESS VIA SYSTEM-LEVEL TRUSTED AUTHORITIES

CROSS-REFERENCE TO RELATED APPLICATION

This application is a non-provisional application of and claims priority to U.S. Provisional Application No. 63/379,505, filed Oct. 14, 2022, which is incorporated by reference herein in its entirety.

BACKGROUND

Access control readers are widely used in various settings to control access to restricted areas. These readers are typically connected to a server that manages access control policies and configurations. In order to securely communicate with such readers, user devices employ various encryption protocols.

SUMMARY

In some aspects, the techniques described herein relate to a method including: establishing a secure channel between a first device and a second device using a system specific trusted authority; determining, by the first device, using a first certificate associated with the second device, a first set of access rights of the second device; and determining, by the second device, using a credential associated with the first device, a second set of access rights of the first device.

In some aspects, the techniques described herein relate to a method, further including: authorizing the first device to access one or more resources available in at least one of a local environment of the first device or the second device; and authorizing the second device to access the one or more resources available in the local environment of the first device.

In some aspects, the techniques described herein relate to a method, the authorizing of the first device and the second device being performed based on the first certificate and the credential, and wherein the system specific trusted authority includes a trusted authority that a system owner of the second device allows to be trusted by the second device and by the first device entitled to authenticate to that second device.

In some aspects, the techniques described herein relate to a method, wherein the first certificate may include a remote system certificate including a public key certificate for the second device, signed by a trusted remote system issuer, and wherein the first certificate includes the first set of access rights.

In some aspects, the techniques described herein relate to a method, wherein the one or more resources available in at least one of the local environment of the first device or the second device include at least one of data or a set of operations available in the local environment of the first device.

In some aspects, the techniques described herein relate to a method, wherein the one or more resources available in the local environment of the first device include a secure file and a physical component.

In some aspects, the techniques described herein relate to a method, wherein the credential may authorize the first device to perform logical access control operations and physical access control operations.

In some aspects, the techniques described herein relate to a method, wherein the credential may include single sign-on information for accessing a plurality of secure files.

In some aspects, the techniques described herein relate to a method, wherein the secure channel is established based on public key mutual authentication.

In some aspects, the techniques described herein relate to a method, wherein the first certificate is signed by a first system-level trusted authority and the credential is signed by a second system-level trusted authority.

In some aspects, the techniques described herein relate to a method, wherein the first and second device are authorized only via the first and second trusted authorities.

In some aspects, the techniques described herein relate to a method, wherein the first certificate may include system specific custom payloads that correspond to a payload interface of the first device, the specific custom payloads may include information that encodes the first set of access rights.

In some aspects, the techniques described herein relate to a method, wherein the credential may include system specific custom payloads that correspond to a payload interface of the second device, the specific custom payloads may include information that encodes the second set of access rights.

In some aspects, the techniques described herein relate to a method, further including checking by the second device, using the credential, whether the first device is authorized to access one or more resources available in a local environment of the first device.

In some aspects, the techniques described herein relate to a method, further including: establishing an additional secure channel between a local device and the first device; and authorizing the first device or the local device to access one or more resources available in a local environment of the first device.

In some aspects, the techniques described herein relate to a method, wherein the additional secure channel includes a short-range communications channel, and wherein the secure channel established between the first device and the second device includes a long-range communications channel.

In some aspects, the techniques described herein relate to a method, further including: retrieving and accessing the first certificate and the credential as customizable plugins.

In some aspects, the techniques described herein relate to a method, further including: storing on the first device a first static keypair including a first static private key and a first static public key; temporarily storing on the first device a first ephemeral keypair including a first ephemeral private key and a first ephemeral public key; storing the credential on the first device; storing a first list of trusted authorities on the first device; storing on the second device a second static keypair including a second static private key and a second static public key; temporarily storing on the second device a second ephemeral keypair including a second ephemeral private key and a second ephemeral public key; storing the first certificate on the second device; and storing a second list of trusted authorities on the second device.

In some aspects, the techniques described herein relate to a method, further including: exchanging the first and second ephemeral public keys between the first and second devices; generating, by the first device, a first shared secret based on the first ephemeral private key and the second ephemeral public key; generating, by the second device, the first shared secret based on the second ephemeral private key and the first ephemeral public key; transmitting a first message including the first certificate using the first shared secret; checking, by the first device, the first certificate using one or more trusted authorities of the first list of trusted authorities; in response to successfully checking the first certificate, generating a second message including the credential using second and third shared secrets, the second shared secret being generated based on the second static public key and the first ephemeral private key, the third shared secret being generated based on the second static public key and the first static private key; and checking, by the second device, the credential using one or more trusted authorities of the second list of trusted authorities, the first device and second devices being authorized to access the one or more resources in response to successfully checking the first certificate and successfully checking the credential.

In some aspects, the techniques described herein relate to a system including: one or more processors coupled to a memory including non-transitory computer instructions that, when executed by the one or more processors, cause the one or more processors to perform operations including: establishing a secure channel between a first device and a second device using a system specific trusted authority; determining, by the first device, using a first certificate associated with the second device, a first set of access rights of the second device; and determining, by the second device, using a credential associated with the first device, a second set of access rights of the first device.

In some aspects, the techniques described herein relate to a non-transitory computer readable medium including non-transitory computer-readable instructions that, when executed by one or more processors, configure the one or more processors to perform operations including: establishing a secure channel between a first device and a second device using a system specific trusted authority; determining, by the first device, using a first certificate associated with the second device, a first set of access rights of the second device; and determining, by the second device, using a credential associated with the first device, a second set of access rights of the first device.

BRIEF DESCRIPTION OF THE DRAWINGS

FIG. 3 is a flowchart illustrating example operations of the system-level trust and credential authentication system, according to some examples.

DETAILED DESCRIPTION

Figure 1:
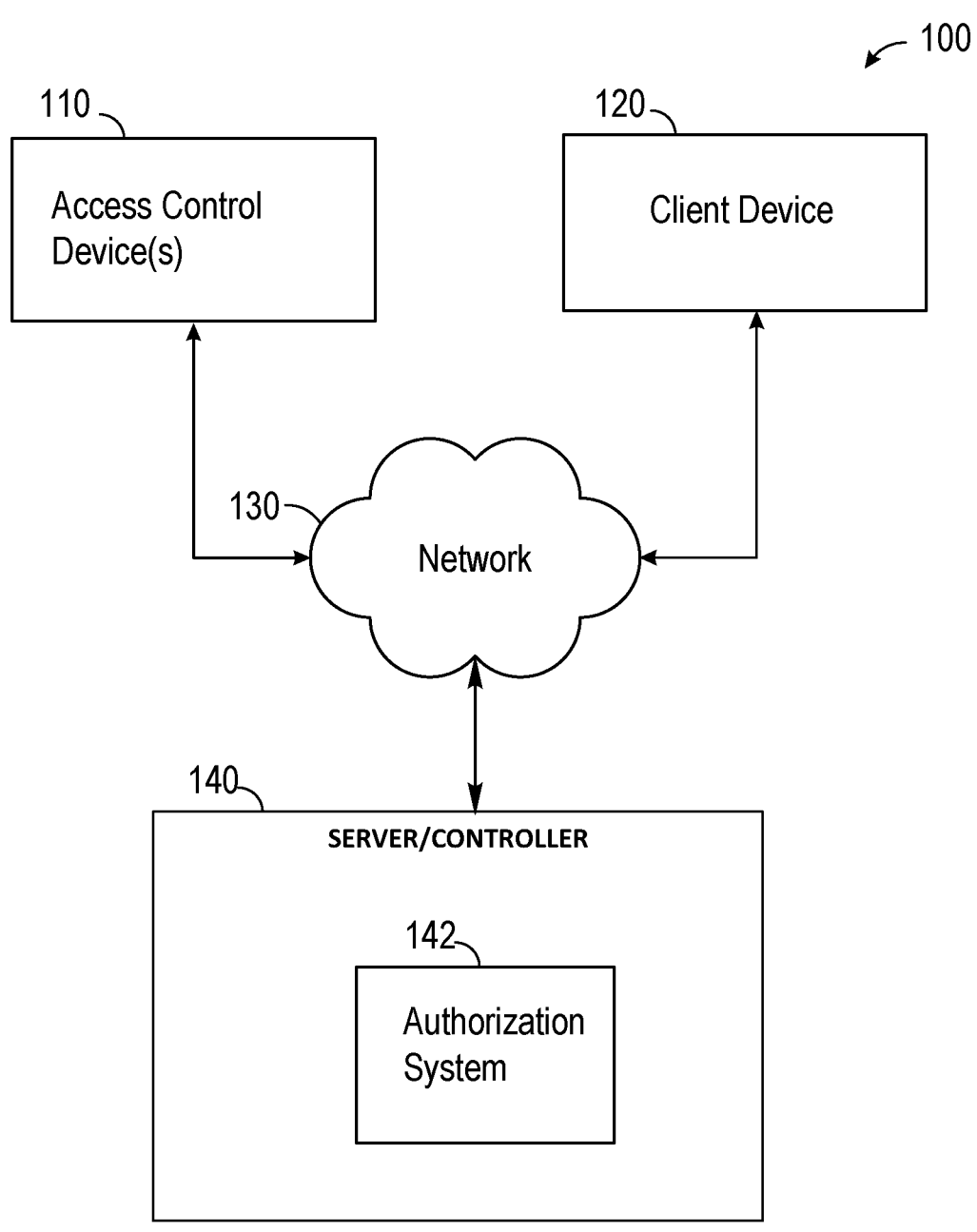
FIG. 1 is a block diagram of an example access control system, according to some examples.

Example methods and systems for performing system-level trust and credential authentication are described. In the following description, for purposes of explanation, numerous specific details are set forth in order to provide a thorough understanding of the examples. It will be evident, however, to one of ordinary skill in the art that examples of the disclosure may be practiced without these specific details.

Typical protocols for access to a remote system employ Internet security protocols that use trust anchors for performing authentication. Such trust anchors include general-purpose Internet certification authorities which are incapable of enforcing system-level trust, meaning with this that the system owner is not in control of the trusted authorities used for public key authentication. Because the trust anchors are general-purpose, the certificates and credentials exchanged in such systems need to conform to certain standards and guidelines and cannot be customized in a system-specific way. As a result, the certificates and credentials can only be used to serve a particular purpose for which they are designed and cannot be leveraged for other uses, such as to perform multi-resource type authentication/authorization, as needed for example to authorize access to both physical resources (e.g., to open a door or a padlock) and logical resources (e.g., to access a file or an account) by means of a single sign-on. In order to obtain access to different types of resources, multiple certificates/credentials need to be stored and exchanged securely in multiple protocols, which consumes a great deal of resources and expense and entails a longer total authentication/authorization timing. Moreover, the support of multiple certificate/credential formats or of multiple protocols, as well as the storage of multiple certificates/credentials, is difficult or impractical to implement on resource-constrained devices.

In addition, typical systems provide for unilateral authentication rather than mutual or bi-lateral authentication. For example, in such systems, a particular device can authenticate itself to a second device to obtain access to certain resources, but these systems do not also allow, in the same exchange, the second device to also authenticate itself to obtain access to the same or different set of resources. Namely, the typical protocol provides for a unilateral, rather than mutual, request-response authentication of a user to the relying party via an authenticator associated therewith (which may either be run on the same device as the user's client or be a roaming authenticator, e.g., a separate device). Hence, this protocol is designed to authorize unidirectional access only, namely a user's access to data and/or operations available in the user's local operational environment and/or on the relying party system. This protocol does not provide for the establishment of a secure channel between a roaming authenticator and the relying party. Thus, this protocol does not encompass the possible execution of a secure transaction between a roaming authenticator and the relying party after accomplishing user authentication. Also, this protocol does not enable the verification of the user's consent/identity to be performed by either the user's client or the relying party, but rather by the authenticator alone.

The present disclosure provides a security mechanism that enables public key mutual authentication between a first device (e.g., a local client, operated by a credential holder) and a second device (e.g., a remote system) based on system-level trust, system-specific user credentials (e.g., customizable credentials), and system-specific remote system certificates. Specifically, the present disclosure provides bidirectional access and authentication, which allows for authorizing of both (1) the credential holder's access to data and/or operations available in the credential holder's local operational environment (including, e.g., a local client and/or a user device) and/or on the remote system and (2) the remote system's access to data and/or operations available in the credential holder's local operational environment (including, e.g., the local client and/or the user device). Moreover, according to the present disclosure, a secure channel can be established between the user device and the remote system, as well as between the user device and the local client (e.g., if distinct from the user device), and a network protocol secure channel (e.g., a transport layer security (TLS) channel) can also be established between the remote system and the local client.

In some examples, the disclosed techniques establish a secure channel between a first device and a second device using a system specific trusted authority. The disclosed techniques determine, by the first device, using a first certificate associated with the second device, a first set of access rights of the second device and determine, by the second device, using a credential associated with the first device, a second set of access rights of the first device.

FIG. 1 is a block diagram showing an example system-level trust and credential authentication system 100, according to various examples. The system-level trust and credential authentication system 100 can be an access control system that includes a client device 120 (also referred to as a user device), one or more access control devices 110 (also referred to as a remote system or remote system device) that control access to a protected asset or secure resource or multiple resources (e.g., physical components and/or logical components, such as computer files), such as through a lockable door, and a server/controller 140 that are communicatively coupled over a network 130 (e.g., LAN, WAN such as the Internet, WiFi, BLE, ultra-wideband (UWB) communication protocol, telephony network, or other long-range wired or wireless communication protocols).

The client device 120 and the access control devices 110 can be communicatively coupled via electronic messages (e.g., packets exchanged over the Internet, BLE, UWB, WiFi Direct, NFC, or any other protocol). While FIG. 1 illustrates a single access control device 110 and a single client device 120, it is understood that a plurality of access control devices 110 and a plurality of client devices 120 can be included in the system-level trust and credential authentication system 100 in other examples. As used herein, the term "client device" may refer to any machine that interfaces to a communications network (such as network 130) to exchange credentials with an access control device 110, the server/controller 140, another client device 120, or any other component to obtain access to the asset or resource protected by the access control device 110. In some examples, the client device 120 can additionally or alternatively communicate directly with, e.g., an access control device or another client device 120.

In some cases, the client devices 120 include multiple user devices in the same physical environment. In such cases, the client devices 120 can include a first device and a local device that are coupled to each other securely over a short-range communication path, such as Bluetooth, Wi-Fi direct, NFC, or any other suitable communication protocol. The first device and the local device can establish secure connections in any of the disclosed techniques similar to those in which the client device 120 and the access control device 110 establish secure connections.

In some cases, some or all of the components and functionality of the server/controller 140 can be included in the client device 120 and/or the access control device 110. A client device 120 (and local device) may be, but is not limited to, a mobile phone, desktop computer, laptop, portable digital assistant (PDA), smart phone, a wearable device (e.g., a smart watch), tablet, ultrabook, netbook, laptop, multi-processor system, microprocessor-based or programmable consumer electronics, a smartcard, or any other communication device that a user may use to access a network and/or store credentials.

The access control device 110 can include an access reader device (also referred to as an access control reader) connected to a secure/protected resource (e.g., a door locking mechanism or backend server) that controls the secure/protected resource (e.g., door locking mechanism). The resource associated with the access control device 110 can include a door lock, an ignition system for a vehicle, or any other device that grants or denies access to a physical component or that can be operated to grant or deny access to the physical component. For example, in the case of a door lock, the access control device 110 can deny access, in which case the door lock remains locked and the door cannot be opened; or can grant access, in which case the door lock becomes unlocked to allow the door to be opened. As another example, in the case of an ignition system, the access control device 110 can deny access, in which case the vehicle ignition system remains disabled and the vehicle cannot be started; or can grant access, in which case the vehicle ignition becomes enabled to allow the vehicle to be started.

Physical access control covers a range of systems and methods to govern access, for example, by people, to secure areas or assets. Physical access control includes identification of authorized users or devices (e.g., vehicles, drones, etc.) and actuation of a gate, door, or other facility used to secure an area or actuation of a control mechanism, e.g., a physical or electronic/software control mechanism, permitting access to a secure asset. The access control device 110 forms part of a physical access control system (PACS), which can include a reader (e.g., an online or offline reader) that may hold authorization data (also referred to access control information) and can be capable of determining whether credentials (e.g., from credential or key devices such as radio frequency identification (RFID) chips in cards, fobs, or personal electronic devices such as mobile phones) are authorized for an actuator or control mechanism (e.g., door lock, door opener, software control mechanism, turning off an alarm, etc.), or a PACS can include a host server to which readers and actuators are connected (e.g., via a controller) in a centrally managed configuration.

In centrally managed configurations, readers can obtain credentials from credential or key devices and pass those credentials to the PACS host server or headend system. The readers can send the credentials over a wired or wireless link. The host server then determines whether the credentials authorize access to the secure area or secure asset and commands the actuator or other control mechanism accordingly by sending an allow/deny message back to the reader again over the wired or wireless link. While examples in physical access control are used herein, the disclosure applies equally to logical access control system (LACS) use cases (e.g., logical access to personal electronic devices, rider identification in transport services, access and asset control in unmanned stores, logical access to secure files stored on the client device 120 and/or the access control device 110, and so forth). In such cases, the client device 120 can communicate credentials to the access control device 110 securely over an established secure channel. The access control device 110 can check the credentials and verify whether the client device 120 is authorized to access one or more logical resources and/or one or more physical resources. In response to successfully determining that the client device 120 is authorized to access one or more logical resources and/or one or more physical resources, the access control device 110 can send an instruction or command to the client device 120 to unlock access to the one or more logical resources, such as one or more secure files. Additionally or alternatively, the access control device 110 can send an instruction or command to the client device 120 to unlock access to the one or more physical resources, such as a physical door to a building.

In general, the access control device 110 (and the client device 120) can include one or more of a memory, a processor, one or more antennas, a communication module, a network interface device, a user interface, and a power source or supply. The memory of the access control device 110 can be used in connection with the execution of application programming or instructions by the processor of the access control device 110, and for the temporary or long-term storage of program instructions or instruction sets and/or credential or authorization data, such as credential data, credential authorization data, or access control data or instructions. For example, the memory can contain executable instructions that are used by the processor to run other components of access control device 110 and/or to make access determinations based on credential or authorization data.

The memory of the access control device 110 can comprise a computer readable medium that can be any medium that can contain, store, communicate, or transport data, program code, or instructions for use by or in connection with access control device 110. The computer readable medium can be, for example, but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), Dynamic RAM (DRAM), any solid-state storage device in general, a compact disc read-only memory (CD-ROM), or other optical or magnetic storage device. Computer-readable media includes, but is not to be confused with, computer-readable storage medium, which is intended to cover all physical, non-transitory, or similar examples of computer-readable media.

The processor of the access control device 110 can correspond to one or more computer processing devices or resources. For instance, the processor can be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor can be provided as a microprocessor, Central Processing Unit (CPU), or plurality of microprocessors or CPUs that are configured to execute instructions sets stored in an internal memory and/or memory of the access control device 110.

The antenna of the access control device 110 can correspond to one or multiple antennas and can be configured to provide for long-range wireless communications between access control device 110 and a credential or key device (e.g., client device 120). The antenna can be arranged to operate using one or more long-range wireless communication protocols and operating frequencies including, but not limited to, the IEEE 802.15.1, Bluetooth, BLE, NFC, Zig-Bee, Global System for Mobile communications (GSM), Code Division Multiple Access (CDMA), Wi-Fi, RF, UWB, and the like. By way of example, the antenna(s) can be RF antenna(s), and as such, may transmit/receive RF signals through free space to be received/transferred by a credential or key device having an RF transceiver.

A communication module of the access control device 110 can be configured to communicate according to any suitable communications protocol with one or more different systems or devices either remote or local to access control device 110, such as one or more client devices 120 and/or server/controller 140. In some cases, the communication module of the access control device 110 is configured to perform the disclosed authentication protocol securely. Namely, the communication module can be implemented as part of the access control device 110 and/or the client device 120 to perform the authentication protocol, discussed in connection with FIG. 2. Specifically, the communication module of the access control device 110 can be used to establish a secure channel between a first device (e.g., the client device 120) and a second device (e.g., access control device 110) using a system specific trusted authority. The communication module of the access control device 110 can be used to authorize the first device to access one or more resources available in at least one of a local environment of the first device or the second device. The communication module of the access control device 110 can be used to authorize the second device to access the one or more resources available in the local environment of the first device.

In some cases, the communication module uses a same wired or wireless link between the access control device 110 and the controller 140 for all the communication modes. In some cases, the communication module uses one wired or wireless link between the access control device 110 and the controller 140 to communicate access control information and uses a different wired or wireless link to communicate or receive configuration information updates from the controller 140 over an Internet Protocol (IP) communication mode.

The network interface device of the access control device 110 includes hardware to facilitate communications with other devices, such as a one or more client devices 120 and/or server/controller 140 (e.g., a PACS server), over a communication network, such as network 130, utilizing any one of a number of transfer protocols (e.g., frame relay, IP, transmission control protocol (TCP), user datagram protocol (UDP), hypertext transfer protocol (HTTP), etc.). Example communication networks can include a LAN, a WAN, a packet data network (e.g., the Internet), mobile telephone networks (e.g., cellular networks), Plain Old Telephone (POTS) networks, wireless data networks (e.g., IEEE 802.11 family of standards known as Wi-Fi, IEEE 802.16 family of standards known as WiMax), IEEE 802.15.4 family of standards, and peer-to-peer (P2P) networks, among others. In some examples, network interface device can include an Ethernet port or other physical jack, a Wi-Fi card, a Network Interface Card (NIC), a cellular interface (e.g., antenna, filters, and associated circuitry), or the like. In some examples, network interface device can include a plurality of antennas to wirelessly communicate using at least one of single-input multiple-output (SIMO), multiple-input multiple-output (MIMO), or multiple-input single-output (MISO) techniques.

A user interface of the access control device 110 can include one or more input devices and/or display devices. Examples of suitable user input devices that can be included in the user interface include, without limitation, one or more buttons, a keyboard, a mouse, a touch-sensitive surface, a stylus, a camera, a microphone, and so forth. Examples of suitable user output devices that can be included in the user interface include, without limitation, one or more LEDs, an LCD panel, a display screen, a touchscreen, one or more lights, a speaker, and so forth. It should be appreciated that the user interface can also include a combined user input and user output device, such as a touch-sensitive display or the like.

The network 130 may include, or operate in conjunction with, an ad hoc network, an intranet, an extranet, a virtual private network (VPN), a LAN, a wireless network, a wireless LAN (WLAN), a WAN, a wireless WAN (WWAN), a metropolitan area network (MAN), BLE, UWB, the Internet, a portion of the Internet, a portion of the Public Switched Telephone Network (PSTN), a POTS network, a cellular telephone network, a wireless network, a Wi-Fi® network, another type of network, or a combination of two or more such networks. For example, a network or a portion of a network may include a wireless or cellular network and the coupling may be a CDMA connection, a GSM connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other short-range or long-range protocols, or other data transfer technology.

In an example, as the client device 120 approaches the access control device 110 (e.g., comes within range of a BLE communication protocol), the client device 120 transmits credentials of the client device 120 over the network 130. In some cases, the credentials can be selected from a plurality of credentials based on a current geographical location of the client device 120. For example, multiple credentials, each associated with a different geographical location, can be stored on the client device 120. When the client device 120 comes within a certain distance of a geographical location associated with one of the credentials (e.g., within 10 meters), the client device 120 retrieves the associated credentials from local memory.

In one example, the client device 120 provides the credentials directly to the access control device 110. In such cases, the access control device 110 communicates the credentials with the server/controller 140. The server/controller 140 in FIG. 1 includes an authorization system 142. The server/controller 140, client device 120, and/or the access control device 110 can further include elements described with respect to FIGS. 4 and 5, such as a processor and memory, having instructions stored thereon, that when executed by the processor, cause the processor to control the functions of the server/controller 140, client device 120, and/or the access control device 110.

The server/controller 140 searches a list of credentials stored in the authorization system 142 to determine whether the received credentials match credentials from the list of authorized credentials for accessing a secure asset or resource (e.g., door or secure area) protected by the access control device 110. In response to determining that the received credentials are authorized to access the access control device 110, the server/controller 140 instructs the access control device 110 to perform an operation granting access for the client device 120 (e.g., instructing the access control device 110 to unlock a lock of a door). In another example, the client device 120 provides the credentials to the server/controller 140, such as using one or more shared secret keys.

The server/controller 140 searches a list of credentials stored in the authorization system 142 to determine whether the received credentials match credentials from the list of authorized credentials for accessing a secure asset or resource (e.g., door or secure area) protected by the access control device 110. In response to determining that the received credentials are authorized to access the access control device 110, the server/controller 140 instructs the access control device 110 (associated with the received credentials and within a geographical distance of the client device 120) to perform an operation granting access to the client device 120 (e.g., instructing the access control device 110 to unlock a lock of a door).

In some examples, the client device 120 and the access control device 110 can initially establish an unsecure communication channel. Over this unsecure communication channel (e.g., prior to the client device 120 and the access control device 110 authenticating each other), the client device 120 and the access control device 110 can perform a Diffie-Hellman key exchange or other protocol to allow the devices to exchange and/or establish a privacy keypair (e.g., privacy public keys). These keys are later used to exchange static public keys of the client device 120 and the access control device 110 that are permanent keys used by the devices to communicate securely and encrypt messages sent to other devices. These static public keys generally remain unchanged across sessions.

The access control device 110 can generate a first pair of ephemeral keys (e.g., including a private ephemeral key and a public ephemeral key). The access control device 110 communicates the public ephemeral key of the first pair of keys to the client device 120. Based on the public ephemeral key, the client device 120 can generate a second pair of ephemeral keys (e.g., including a private ephemeral key and a public ephemeral key). As referred to herein, ephemeral keys represent keys that are session specific and that expire and are no longer usable after some condition is satisfied (e.g., after a threshold period of time elapses and/or after the keys are used a threshold quantity of times). The client device 120 can transmit to the access control device 110 the public ephemeral key of the second pair of ephemeral keys.

In some examples, the access control device 110 and the client device 120 can perform mutual authentication through public key cryptography that is based on system-level trust, system-specific user credentials, and/or system-specific remote system certificates. In such cases, the authentication endpoint located in the user's local operational environment (e.g., where the client device 120 is physically located) and acting on the user's behalf can include a user device associated with the user and containing one or more user credentials. The client device 120 can use the credentials (which can be encoded in a certificate associated with the client device 120) so that the user can authenticate themself as a credential holder to the access control device 110 (e.g., the remote system).

The access control device 110 and the client device 120 (including one or more local devices) can establish a secure channel as a result of their public key mutual authentication. This secure channel, possibly along with a network protocol secure channel between the access control device 110 and the client device 120, can be a TLS channel. In some cases, multiple devices in a user's local environment including client device 120 can also establish respective secure channels, such as between a device physically in a user's environment (e.g., a local client) and another device in the same physical environment (e.g., the user device). These secure channels can be used to securely exchange the captured/reference data between devices coupled to the secure channels.

The access control device 110 (e.g., the remote system) and the client device 120 (e.g., the user device) may trust system-level trusted authorities only. In this way, either party (e.g., the access control device 110 or the client device 120) can only trust the other party indirectly, namely by trusting the system-level trusted authority, which signed the other party's user credential or remote system certificate, respectively. In some examples, the access control device 110 can establish a secure communications channel (e.g., via a long-range communications path) with the client device 120. Through this secure communications channel, the access control device 110 can transmit the system-specific remote system certificate which is signed by the system specific trusted authority. The client device 120 can check the payload of the certificate against a list of trusted authorities. In response to successfully verifying the payload and authenticity of the certificate, the client device 120 can proceed to provide a credential (encoded in a certificate) to the access control 110.

In some examples, the client device 120 may capture and/or verify the user's consent/identity according to its capabilities and configuration. For example, the client device 120 can receive input from a user (e.g., via an action, such as but not limited to, pushing a button, inputting a secret such as a password or a PIN, capturing biometric data, upon authentication, and/or just upon log-in). In some cases, the client device 120 can establish a separate short-range communications-based secure connection with a local device (e.g., a smartcard or mobile phone) and can receive the input including the consent/identity from the local device (also referred to as the local client). In such cases, the access control device 110 may perform verification alone. The client device 120 can transmit the credential to the access control device 110 over the long-range secure channel after receiving the user's consent/identity. In some cases, the client device 120 can receive an input request to login using single-sign-on to a service and based on that request, the client device 120 can transmit the credentials to the access control device 110 for verification. The same client device 120 can also receive a request to access a physical protected resource, such as a door lock. In such cases, the client device 120 can also transmit a separate credential or a payload in the initial credential requesting both access to the service using the single-sign-on process and access to the physical protected resource. The access control device 110 can check the credentials and, upon successfully verifying authenticity of the credentials and access rights, the access control device 110 can transmit a message back to the client device 120 authorizing access to the single-sign-on process and access to the physical protected resource. In some cases, the access control device 110 can automatically unlock the physical protected resource along with transmitting a message authorizing access to the service via the single-sign-on process.

In some examples, both the user credentials and remote system certificates can contain system-specific payloads, agreeing with the payload interface respectively used and associated with the remote system and by the user device. Such payloads can either comply with some given standard or be custom payloads configured for the system. The payloads can encode access rights to various local resources, remote resources, and/or both local and remote resources of different types. For example, such payloads can encode a set of credential holder's access rights to data and/or operations available in the credential holder's local operational environment (including, e.g., the local client and/or the user device) or on the access control device 110 (e.g., the remote system). The payloads can additionally or alternatively include a set of access rights the access control device 110 has to data and/or operations available in the credential holder's local operational environment (including, e.g., the client device 120, such as the local client and/or the user device). Encoding access rights in the user credentials that apply to the credential holder's local operational environment enables the access control device 110 (e.g., the remote system) to remotely check the credentials and notify the outcome to the client device 120 (e.g., including the user device and/or the local client). The access rights, stored in or associated with the credential, can span not only logical operations (e.g., accessing a file or performing single sign on to one or more online services) but also physical operations (e.g., opening a door controlled by the access control device 110 and/or the client device 120). For example, the client device 120 can include a door lock, and the access control device 110 could authorize the client device 120 to open or operate the door lock based on the credential holder's access rights encoded in the user credential.

In addition to providing the system owner with full control over the management of trust and access rights, system-level trust enables handling the payloads of user credentials and remote system certificates as customizable plugins of a relatively minimal basic structure. Plugin designs are enabled by an agreement between the interface called for by a basic consuming component for consumed data/services and the interface provided by a plugin component.

Figure 2:
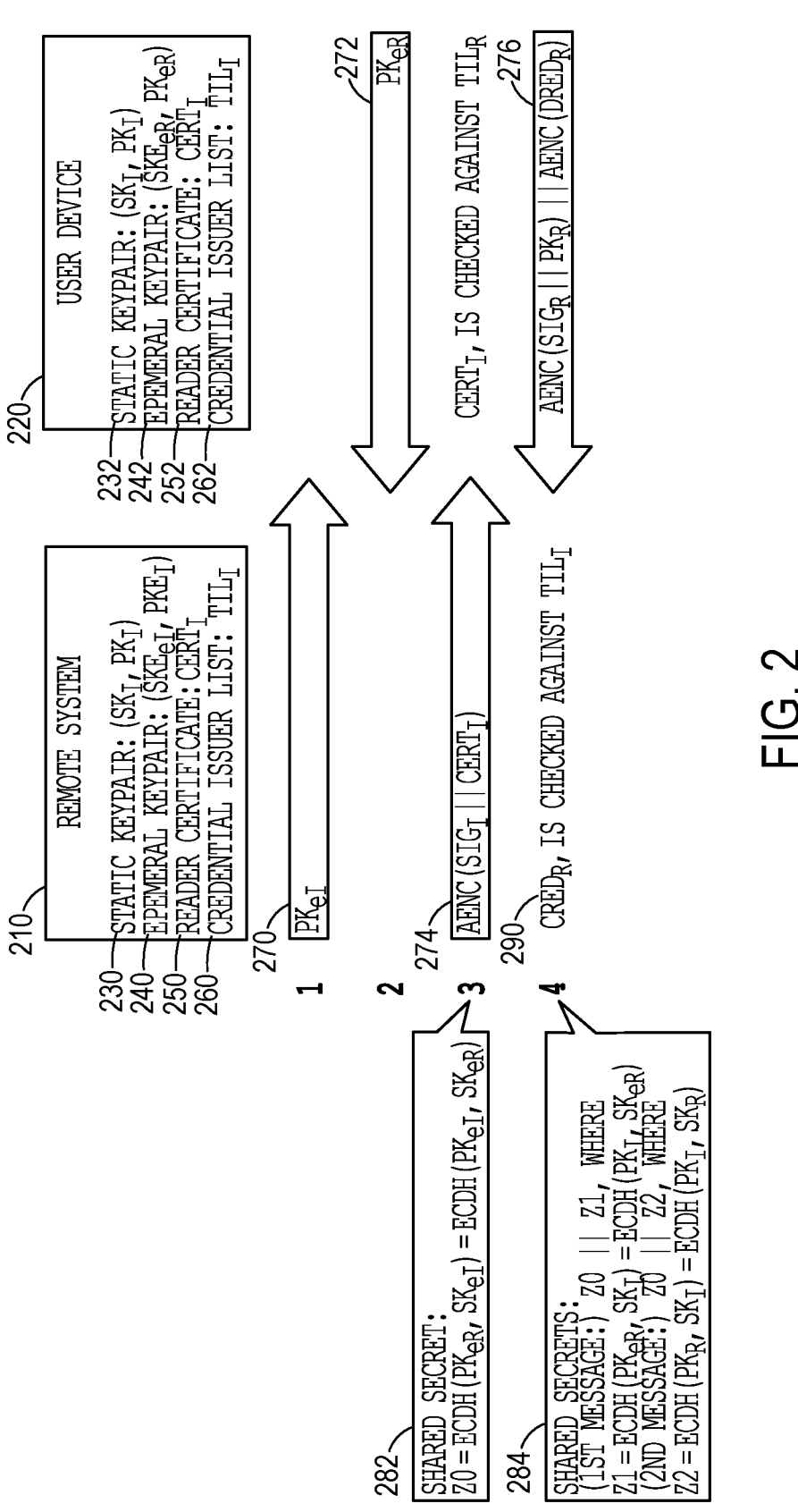
FIG. 2 illustrates an example diagram of a flow representing system-level trust and credential authentication, according to some examples.

FIG. 2 illustrates an example diagram 200 of a flow representing system-level trust and credential authentication, according to some examples. As shown in the diagram 200, a remote system 210 (e.g., the access control device 110) and a user device 220 (e.g., the client device 120) can establish a secure session for communication. The remote system 210 can store a first static keypair 230 including a first static private key ($Sk_I$) and a first static public key ($PK_I$). The user device 220 can store a second static keypair 232 including a second static private key ($SK_R$) and a second static public key ($PK_R$). The remote system 210 can also store/generate a first ephemeral keypair 240 (including a first ephemeral private key $SK_{eI}$ and a first ephemeral public key $PK_{eI}$). The user device 220 can also store/generate a second ephemeral keypair 242 (including a second ephemeral private key $SK_{eR}$ and a second ephemeral public key $PK_{eR}$). In some examples, an additional device (not shown) local to the user device 220 can store/generate a third ephemeral keypair (including a third ephemeral private key and a third ephemeral public key). The manner in which a secure channel is established between the remote system 210 and the user device 220 can similarly be performed to establish a secure channel between the user device 220 and the additional device in the local environment of the user device 220.

In some examples, before the access control device 110 identifies itself to the client device 120, the access control device 110 and the client device 120 can perform a Diffie-Hellman key exchange. In this exchange, the access control device 110 (e.g., the first party to identify itself) can generate the first ephemeral keypair 240.

The remote system 210 can also generate/store a certificate 250 and a credential issuer list 260 (e.g., $TIL_I$). The credential issuer list 260 can include a public key list associated with the user device 220. The user device 220 can also generate/store a credential 252 and a reader system issuer list 262 (e.g., $TIL_R$). The reader system issuer list 262 can include a public key list associated with the access control device 110.

In some examples, the system-level remote system issuer can generate, sign, and issue the certificate 250 (e.g., a remote system certificate $Cert_I$) that is signed with a private key whose corresponding public key is included in the public key list $TIL_R$ or a private key linked to such a public key by a valid certificate chain. The certificate 250 can be bound to the remote system 210 by including the public key $PK_I$ among its signed data. A system-level credential issuer can generate, sign, and issue the credential 252 (e.g., a user credential $Cred_R$) that is signed with a private key whose corresponding public key is included in the public key list $TIL_I$ or a private key linked to such a public key by a valid certificate chain. The credential 252 can be bound to the user device 220 by including the public key $PK_R$ or else a hash of the public key $PK_R$ among its signed data.

In some examples, a network protocol connection can be established between the user device 220 and the remote system 210. This can be performed using a network protocol stack, such as an Internet protocol stack over the Internet). In some examples, an additional connection can be established between various devices in the user's local environment including the user device 220 and a local device using a contact-based interface or other short-range wireless or wired transport protocol. The established network protocol connection can include any network protocol secure channel, such as a TLS channel. The devices can perform a public key mutual authentication on top of the network protocol connection between the remote system 210 and the user device 220, as well as on top of the contact-based or short-range wireless connection between the local devices (e.g., if the local devices are distinct devices). This authentication may enforce any security assurance.

In some cases, by using the security assurance, each party is provided with proof that the other party owns an authentication private key that is being identified. For example, the remote system 210 can be provided with proof that the user device 220 has the second static private key (e.g., $SK_R$ and the user device 220 can be provided with proof that the remote system 210 has the first static private key (e.g., $SK_I$). This proof can be provided by the verification of a signature generated with the other party's authentication private key. This proof can be provided with the other party's knowledge of a shared secret whose computation calls for the other party to know the other party's authentication private key.

In some examples, if the public key mutual authentication is successful, a secure channel is established between the remote system 210 and the user device 220 and/or local devices in the environment of the user device 220. The secure channel can enforce any security assurance between the remote system 210 and the user device 220, for example, by having both parties derive one or more shared session keys from a shared secret resulting from one or more key exchanges, performed using either or both of the parties' static keypairs $(SK_I, PK_I)$, $(SK_R, PK_R)$ and/or either or both of the parties' ephemeral keypairs $(SK_{eI}, PK_{eI})$, $(SK_{eR}, PK_{eR})$, possibly generated and used in the public key mutual authentication.

For example, the remote system 210 can transmit a message 270 including the ephemeral public key of the first ephemeral keypair 240 to the user device 220. Similarly, the user device 220 can transmit a message 272 back to the remote system 210 including the ephemeral public key of the second ephemeral keypair 242. The remote system 210 can then generate a first shared secret 282 and use that first shared secret 282 to encrypt the certificate 250 which is sent as a message 274. Specifically, the remote system 210 can generate the first shared secret 282 by applying the Elliptic-curve Diffie-Hellman (ECDH) to the public ephemeral key of the second ephemeral keypair 242 and the private ephemeral key of the first ephemeral keypair 240. The certificate 250 encrypted by the first shared secret 282 can be provided to the user device 220. The user device 220 can compute the first shared secret 282 by applying the ECDH to the ephemeral public key of the first ephemeral keypair 240 and the private ephemeral key of the second ephemeral keypair 242. The user device 220 can decrypt the certificate 250 from the encrypted message using the first shared secret 282.

The user device 220 can then check the certificate 250 against the reader system issuer list 262, such as by using public keys associated with the reader system issuer list 262 and the remote system 210. After successfully verifying the certificate 250, the user device 220 can generate a second shared secret 284 that includes one or more components. The second shared secret 284 can include a first component Z1 that is computed by applying ECDH to the static public key of the first static keypair 230 and the ephemeral private key of the second ephemeral keypair 242. A second component Z2 of the second shared secret 284 can be computed by applying ECDH to the static private key of the second static keypair 232 and the static public key of the first static keypair 230. The user device 220 can generate a message 276 that includes a signature and static public key of the second static keypair 232 encrypted by the first component and that includes the credential 252 encrypted by the second component of the second shared secret 284.

The remote system 210 can compute the first and second components of the second shared secret 284 to decrypt the contents of the message 276. For example, the remote system 210 can compute the first component of the second shared secret 284 by applying ECDH to the static private key of the first static keypair 230 and the ephemeral public key of the second ephemeral keypair 242. The remote system 210 can compute the second component of the second shared secret 284 by applying ECDH to the static public key of the second static keypair 232 and the static private key of the first static keypair 230. After decrypting the message 276, the remote system 210 can perform an operation 290 to check the credential 252 against the credential issuer list 260 such as using public keys associated with the credential issuer list 260 and the user device 220. After successfully verifying the credential 252, the remote system 210 can generate a message for transmission using the first shared secret 282 and/or the second shared secret 284 to the user device 220 authorizing access to one or more logical and/or physical resources.

For example, the user device 220 can transmit a message including the ephemeral public key of the second ephemeral keypair 242 to the additional local devices. Similarly, the additional local devices can transmit a message back to the user device 220 including the ephemeral public key of a third ephemeral keypair. The user device 220 can then generate an individual shared secret and use that shared secret to encrypt a certificate of the user device 220. Specifically, the user device 220 can generate the individual shared secret by applying the ECDH to the public ephemeral key of the third ephemeral keypair and the private ephemeral key of the second ephemeral keypair 242. The certificate of the user device 220 encrypted by the individual shared secret can be provided to the additional local devices. The additional local devices can compute the same individual shared secret by applying the ECDH to the ephemeral public key of the second ephemeral keypair 242 and the private ephemeral key of the third ephemeral keypair associated with the additional local devices. The additional local devices can decrypt the certificate from the encrypted message using the individual shared secret.

The additional local devices can then check the certificate of the user device 220 against the reader system issuer list. After successfully verifying the certificate, the additional local devices can generate an additional shared secret, such as by applying ECDH to the static public key of the second static keypair 232 and the ephemeral private key of the third ephemeral keypair. The additional local devices can generate a message that includes the credential encrypted by the additional shared secret. The user device 220 can compute the additional shared secret to decrypt the contents of the received message. For example, the user device 220 can compute the additional shared secret by applying ECDH to the static private key of the second static keypair 232 and the ephemeral public key of the third ephemeral keypair. After decrypting the message, the user device 220 can check the credential against the credential issuer list 260 and/or provide the credential to the remote system 210 over the prior established connection, such as using the first/second components of the second shared secret 284.

In some examples, if the public key mutual authentication is successful between the additional local devices and the user device 220 (where such devices are distinct), the additional local devices and the user device 220 can establish an additional secure channel enforcing any security assurance. This can be done, for example, by having the additional local devices and the user device 220 derive one or more shared session keys from a shared secret resulting from one or more key exchanges, performed using (a) either or both of the parties' static keypairs $(SK_C, PK_C)$, $(SK_R, PK_R)$ and/or (b) either or both of the parties' possible ephemeral keypairs $(SK_eC, PK_eC)$, $(SK_{eR}, PK_{eR})$. This process is similar to the manner in which the shared secrets are computed for the secure channel established between the remote system 210 and the user device 220.

In some examples, a secure channel may be established between the remote system 210 and the user device 220, and a network protocol secure channel (e.g., a TLS channel) may also be established between the remote system 210 and the additional local devices. The secure channel between the additional local devices and the user device 220 may be established by having the additional local devices send either or both of their public keys $PK_C$, $PK_{eC}$ (if any) to the remote system 210 alone, over their network protocol secure channel, or also to the user device 220, over their contact-based or short-range wireless connection. Additionally, user device 220 can send either or both of its public keys $PK_R$, $PK_{eR}$ (if any) to the remote system 210 alone, upon running the public key mutual authentication, or also to the additional local devices, over their contact-based or short-range wireless connection. The remote system 210 can send to the user device 220, over their previously established secure channel, the public key(s) received from the additional local devices or else a hash or a message authentication code computed (also) over such key(s). The remote system 210 can also send to the additional local devices, over their network protocol secure channel, the public key(s) received from the user device 220, or else a hash or a message authentication code computed (also) over such key(s).

In some examples, the remote system 210 is provided with proof that the user device 220 consists of a user device bound to the credential 252 issued by a trusted Credential Issuer. This proof can be provided by a verification of the signature of the credential 252 with a public key included in the public key list $TIL_I$ or a public key linked to such a public key by a certificate chain whose validity is also verified successfully. In some cases, the proof can be provided by the remote system 210 verifying that the public key or the public key hash included in credential 252 corresponds to the remote system 210 or user device 220 authentication private key.

In some cases, the remote system 210 is provided with proof that additional devices in a local environment of the user device 220 are being operated by the credential holder. This proof can be provided by accomplishment of the public key mutual authentication between the remote system 210 and the user device 220 over the network protocol connection between the remote system 210 and the additional local devices in the environment of the user device 220. The proof can also be provided over the contact-based or short-range wireless connection between the additional local devices and the user device 220, if they are distinct devices. This proof can also be extended with accomplishment of a verification of the user's consent/identity, the public key mutual authentication over a network protocol secure channel between the remote system 210 and the additional local devices (e.g., a TLS channel), and/or the public key mutual authentication over a short-range wireless connection between the additional local devices and the user device 220 enforcing a secure range verification (e.g., using UWB secure ranging), if they are distinct devices and a short-range wireless connection being used.

The remote system 210 is provided with proof that the credential holder is assigned a given set of access rights to data and/or operations available in the credential holder's local operational environment (including, e.g., the additional local devices and/or the user device 220) and/or on the remote system 210. This proof can be provided by a check of the access rights encoded in the signed payloads of the credential 252 or associated with the credential holder on the remote system 210.

In some examples, the credential holder is provided with proof that the other party consists of the remote system 210 bound to the certificate 250, in turn issued by a trusted remote System issuer. This proof can be provided by the user device 220 verifying a signature of the certificate 250 with a public key included in the public key list $TIL_R$ or a public key linked to such a public key by a certificate chain whose validity is also verified successfully. The proof can also be provided by the user device 220 verifying that the public key included in certificate 250 corresponds to the authentication private key of the remote system 210.

In some examples, the credential holder is provided with proof that the remote system 210 is assigned a given set of access rights to data and/or operations available in the credential holder's local operational environment (including, e.g., the additional local devices and/or the user device 220). This proof can be provided by a check of the access rights encoded in the signed payloads of the certificate 250 and/or in the credential metadata contained in or linked to the credential 252.

FIG. 3 is a flowchart illustrating example process 300 or method of the system-level trust and credential authentication system-level trust and credential authentication system 100, according to some examples. The process 300 may be embodied in computer-readable instructions for execution by one or more processors such that the operations of the process 300 or method may be performed in part or in whole by the functional components of the system-level trust and credential authentication system 100; accordingly, the process 300 or method is described below by way of example with reference thereto. However, in other examples, at least some of the operations of the process 300 or method may be deployed on various other hardware configurations. Some or all of the operations of process 300 or method can be in parallel, out of order, or entirely omitted.

At operation 301, the server/controller 140 (e.g., a PACS server), the access control device 110, and/or client device 120 establish a secure channel between a first device and a second device using a system specific trusted authority, as discussed above.

At operation 302, the server/controller 140 and/or the access control device 110 determines, by the first device, using a first certificate associated with the second device, a first set of access rights of the second device, as discussed above.

At operation 303, the server/controller 140 and/or the access control device 110 determines, by the second device, using a credential associated with the first device, a second set of access rights of the first device, as discussed above.

Figure 4:
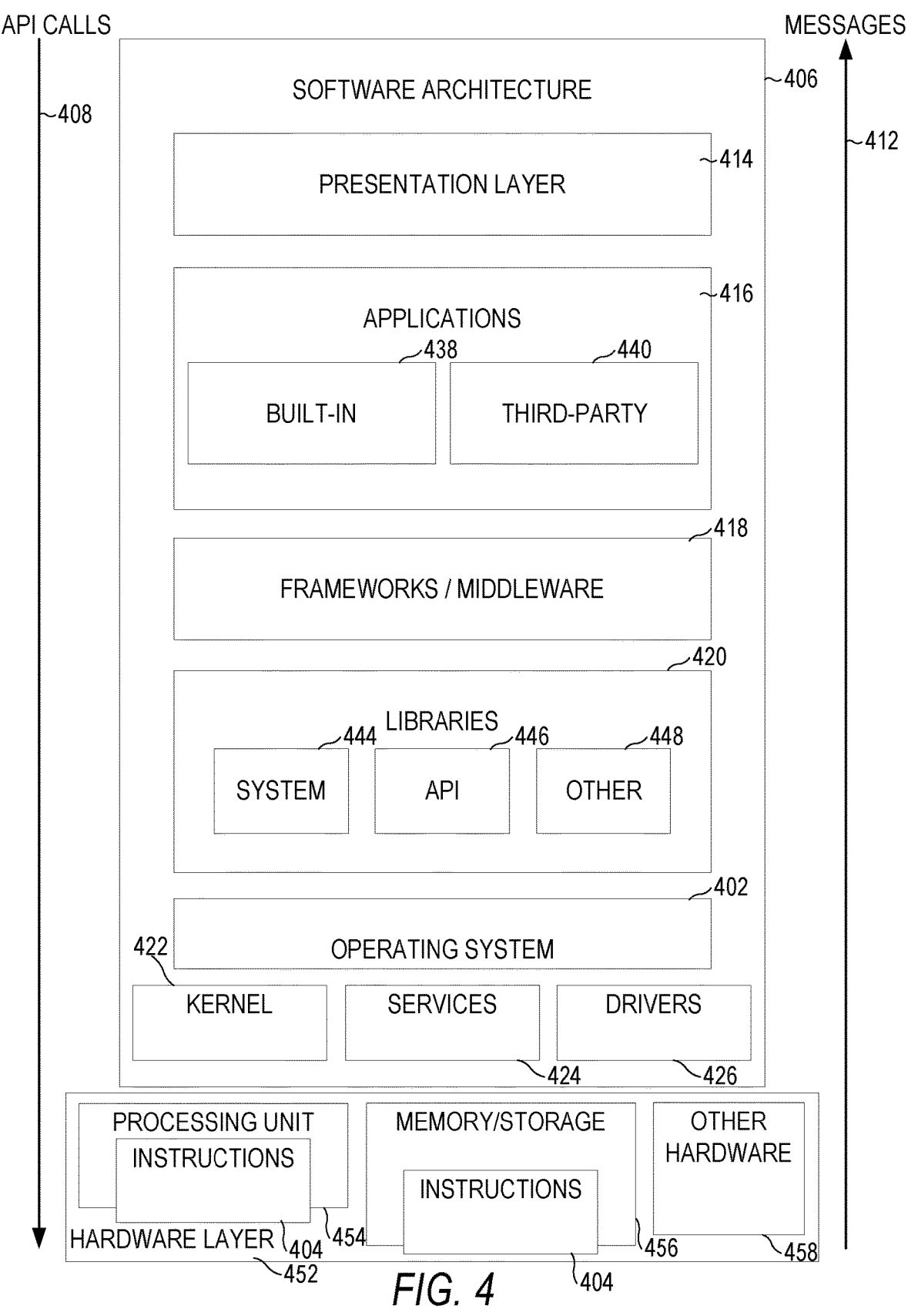
FIG. 4 is a block diagram illustrating an example software architecture, which may be used in conjunction with various hardware architectures herein described.

FIG. 4 is a block diagram illustrating an example software architecture 406, which may be used in conjunction with various hardware architectures herein described. FIG. 4 is a non-limiting example of a software architecture and it will be appreciated that many other architectures may be implemented to facilitate the functionality described herein. The software architecture 406 may execute on hardware such as machine 500 of FIG. 5 that includes, among other things, processors 504, memory 514, and input/output (I/O) components 518. A representative hardware layer 452 is illustrated and can represent, for example, the machine 500 of FIG. 5. The representative hardware layer 452 includes a processing unit 454 having associated executable instructions 404. Executable instructions 404 represent the executable instructions of the software architecture 406, including implementation of the methods, components, and so forth described herein. The hardware layer 452 also includes memory and/or storage devices memory/storage 456, which also have executable instructions 404. The hardware layer 452 may also comprise other hardware 458. The software architecture 406 may be deployed in any one or more of the components shown in FIG. 1.

In the example architecture of FIG. 4, the software architecture 406 may be conceptualized as a stack of layers where each layer provides particular functionality. For example, the software architecture 406 may include layers such as an operating system 402, libraries 420, frameworks/middleware 418, applications 416, and a presentation layer 414. Operationally, the applications 416 and/or other components within the layers may invoke API calls 408 through the software stack and receive messages 412 in response to the API calls 408. The layers illustrated are representative in nature and not all software architectures have all layers. For example, some mobile or special purpose operating systems may not provide a frameworks/middleware 418, while others may provide such a layer. Other software architectures may include additional or different layers.

The operating system 402 may manage hardware resources and provide common services. The operating system 402 may include, for example, a kernel 422, services 424, and drivers 426. The kernel 422 may act as an abstraction layer between the hardware and the other software layers. For example, the kernel 422 may be responsible for memory management, processor management (e.g., scheduling), component management, networking, security settings, and so on. The services 424 may provide other common services for the other software layers. The drivers 426 are responsible for controlling or interfacing with the underlying hardware. For instance, the drivers 426 include display drivers, camera drivers, BLE drivers, UWB drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 420 provide a common infrastructure that is used by the applications 416 and/or other components and/or layers. The libraries 420 provide functionality that allows other software components to perform tasks in an easier fashion than to interface directly with the underlying operating system 402 functionality (e.g., kernel 422, services 424 and/or drivers 426). The libraries 420 may include system libraries 444 (e.g., C standard library) that may provide functions such as memory allocation functions, string manipulation functions, mathematical functions, and the like. In addition, the libraries 420 may include API libraries 446 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional (2D) and three-dimensional (3D) in a graphic content on a display), database libraries (e.g., SQLite that may provide various relational database functions), web libraries (e.g., WebKit that may provide web browsing functionality), and the like. The libraries 420 may also include a wide variety of other libraries 448 to provide many other APIs to the applications 416 and other software components/devices.

The frameworks/middleware 418 (also sometimes referred to as middleware) provide a higher-level common infrastructure that may be used by the applications 416 and/or other software components/devices. For example, the frameworks/middleware 418 may provide various graphic user interface functions, high-level resource management, high-level location services, and so forth. The frameworks/middleware 418 may provide a broad spectrum of other APIs that may be utilized by the applications 416 and/or other software components/devices, some of which may be specific to a particular operating system 402 or platform.

The applications 416 include built-in applications 438 and/or third-party applications 440. Examples of representative built-in applications 438 may include, but are not limited to, a contacts application, a browser application, a book reader application, a location application, a media application, a messaging application, and/or a game application. Third-party applications 440 may include an application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 440 may invoke the API calls 408 provided by the mobile operating system (such as operating system 402) to facilitate functionality described herein.

The applications 416 may use built-in operating system functions (e.g., kernel 422, services 424, and/or drivers 426), libraries 420, and frameworks/middleware 418 to create user interfaces to interact with users of the system. Alternatively, or additionally, in some systems, interactions with a user may occur through a presentation layer, such as presentation layer 414. In these systems, the application/component "logic" can be separated from the aspects of the application/component that interact with a user.

Figure 5:
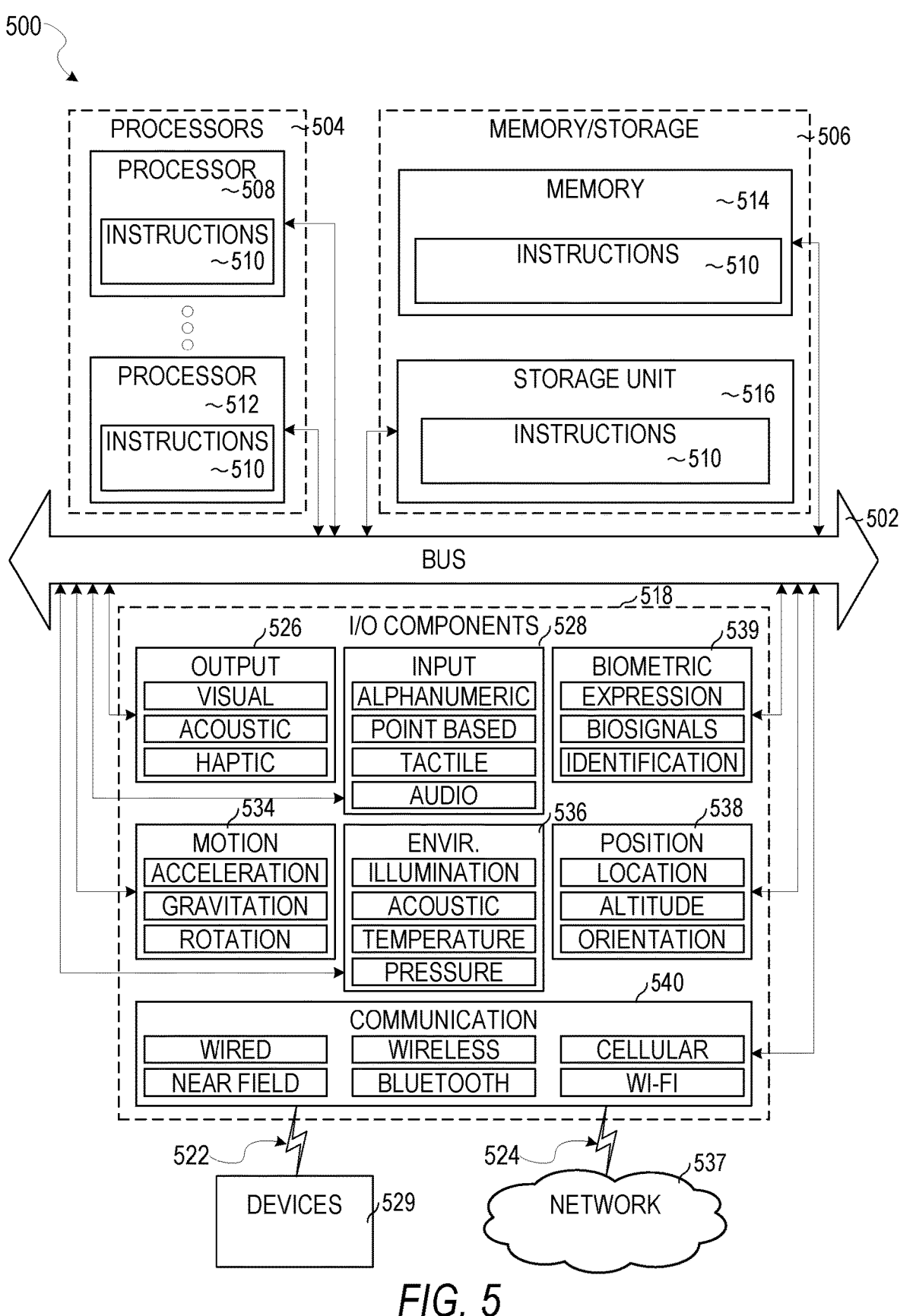
FIG. 5 is a block diagram illustrating components of a machine, according to some examples.

FIG. 5 is a block diagram illustrating components of a machine 500, according to some examples, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 510 (e.g., software, a program, an application, an applet, an app, or other executable code) for causing the machine 500 to perform any one or more of the methodologies discussed herein may be executed.

As such, the instructions 510 may be used to implement devices or components described herein. The instructions 510 transform the general, non-programmed machine 500 into a particular machine 500, such as the client device 120, access control device 110, or server/controller 140, programmed to carry out the described and illustrated functions in the manner described. In alternative examples, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 510, sequentially or otherwise, that specify actions to be taken by machine 500. Further, while only a single machine 500 is illustrated, the term "machine" shall also be taken to include a collection of machines that individually or jointly execute the instructions 510 to perform any one or more of the methodologies discussed herein.

The machine 500 may include processors 504, memory/storage 506, and I/O components 518, which may be configured to communicate with each other such as via a bus 502. In an example, the processors 504 (e.g., a CPU, a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 508 and a processor 512 that may execute the instructions 510. The term "processor" is intended to include multi-core processors 504 that may comprise two or more independent processors (sometimes referred to as "cores") that may execute instructions contemporaneously. Although FIG. 5 shows multiple processors 504, the machine 500 may include a single processor with a single core, a single processor with multiple cores (e.g., a multi-core processor), multiple processors with a single core, multiple processors with multiple cores, or any combination thereof.

The memory/storage 506 may include a memory 514, such as a main memory, or other memory storage, database, and a storage unit 516, all accessible to the processors 504 such as via the bus 502. The storage unit 516 and memory 514 store the instructions 510 embodying any one or more of the methodologies or functions described herein. The instructions 510 may also reside, completely or partially, within the memory 514, within the storage unit 516, within at least one of the processors 504 (e.g., within the processor's cache memory), or any suitable combination thereof, during execution thereof by the machine 500. Accordingly, the memory 514, the storage unit 516, and the memory of processors 504 are examples of machine-readable media.

The I/O components 518 may include a wide variety of components to receive input, provide output, produce output, transmit information, exchange information, capture measurements, and so on. The specific I/O components 518 that are included in a particular machine 500 will depend on the type of machine. For example, portable machines such as mobile phones will likely include a touch input device or other such input mechanisms, while a headless server machine will likely not include such a touch input device. It will be appreciated that the I/O components 518 may include many other components that are not shown in FIG. 5. The I/O components 518 are grouped according to functionality merely for simplifying the following discussion and the grouping is in no way limiting. In various examples, the I/O components 518 may include output components 526 and input components 528. The output components 526 may include visual components (e.g., a display such as a plasma display panel (PDP), a LED display, a LCD, a projector, or a cathode ray tube (CRT)), acoustic components (e.g., speakers), haptic components (e.g., a vibratory motor, resistance mechanisms), other signal generators, and so forth. The input components 528 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further examples, the I/O components 518 may include biometric components 539, motion components 534, environmental components 536, or position components 538 among a wide array of other components. For example, the biometric components 539 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 534 may include acceleration sensor components (e.g., accelerometer), gravitation sensor components, rotation sensor components (e.g., gyroscope), and so forth. The environmental components 536 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 538 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 518 may include communication components 540 operable to couple the machine 500 to a network 537 or devices 529 via coupling 524 and coupling 522, respectively. For example, the communication components 540 may include a network interface component or other suitable device to interface with the network 537. In further examples, communication components 540 may include wired communication components, wireless communication components, cellular communication components, NFC components, Bluetooth® components (e.g., Bluetooth® Low Energy), Wi-Fi® components, and other communication components to provide communication via other modalities. The devices 529 may be another machine or any of a wide variety of peripheral devices (e.g., a peripheral device coupled via a USB).

Moreover, the communication components 540 may detect identifiers or include components operable to detect identifiers. For example, the communication components 540 may include RFID tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 540, such as location via IP geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices or that communicates directly with such other devices or server systems. A client device may be, but is not limited to, a mobile phone, desktop computer, laptop, PDA, smart phone, tablet, ultrabook, netbook, laptop, multi-processor system, microprocessor-based or programmable consumer electronics, game console, STB, or any other communication device that a user may use to access a network.

"COMMUNICATIONS NETWORK" in this context refers to one or more portions of a network that may be an ad hoc network, an intranet, an extranet, a VPN, a LAN, a BLE network, a UWB network, a WLAN, a WAN, a WWAN, a MAN, the Internet, a portion of the Internet, a portion of the PSTN, a POTS network, a cellular telephone network, a wireless network, a Wi-Fi® network, another type of network, or a combination of two or more such networks. For example, a network or a portion of a network may include a wireless or cellular network and the coupling may be a CDMA connection, a GSM connection, or other type of cellular or wireless coupling. In this example, the coupling may implement any of a variety of types of data transfer technology, such as 1×RTT, EVDO technology, GPRS technology, EDGE technology, 3GPP including 3G, 4G networks, UMTS, HSPA, WiMAX, LTE standard, others defined by various standard setting organizations, other long-range protocols, or other data transfer technology.

"MACHINE-READABLE MEDIUM" in this context refers to a component, device, or other tangible media able to store instructions and data temporarily or permanently and may include, but is not limited to, RAM, ROM, buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a FPGA or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

"Authorization": In addition to any ordinary or customary meaning, is intended to include a process of verifying that another party in a public key mutual authentication is assigned permission to have access to given data and/or operation(s).

(User) "Credential": In addition to any ordinary or customary meaning, is intended to include a logical entity, signed by a trusted Credential Issuer, which allows for identification of a Credential Holder, and which may encode a set of Credential Holder's access rights to data and/or operations available in the Credential Holder's local operational environment (including, e.g., a Local Client and/or a User Device) and/or on the Remote System.

"Credential Holder": In addition to any ordinary or customary meaning, is intended to include an entity (e.g., a person) that is given a Credential.

"Credential Issuer": In addition to any ordinary or customary meaning, is intended to include a Trusted Authority trusted by the Remote System that generates, signs, and issues a Credential either directly or via a delegate Trusted Authority.

"Credential Metadata": In addition to any ordinary or customary meaning, is intended to include any data possibly contained in or linked to a Credential that can be used by a User Device but is not exchanged during public key mutual authentication between a Remote System and the User Device until public key mutual authentication is completed successfully. Such data may include, for example, a set of the Remote System's access rights to data and/or operations available in the Credential Holder's local operational environment (including, e.g., a Local Client and/or a User Device).

"Identity": In addition to any ordinary or customary meaning, is intended to include something that identifies an entity (e.g., user, company).

"Local Client": In addition to any ordinary or customary meaning, is intended to include a device located in a Credential Holder's local operational environment, which may either (1) match a User Device or (2) be connected with the User Device, for example, via a contact-based interface (e.g., a USB interface) or a short-range wireless transport protocol (e.g., NFC, BLE, or Wi-Fi Aware).

"Remote System": In addition to any ordinary or customary meaning, is intended to include a system connected with a Local Client over a network (e.g., the internet), which, as a result of a successful public key mutual authentication with a User Device, can (1) grant a Credential Holder access to data and/or operations available in the Credential Holder's local operational environment (including, e.g., the Local Client and/or the User Device) or on the Remote System or (2) have access, itself, to data and/or operations available in the Credential Holder's local operational environment (including, e.g., the Local Client and/or the User Device).

"Remote System Certificate": In addition to any ordinary or customary meaning, is intended to include a public key certificate for a Remote System, signed by a trusted Remote System Issuer, and which may contain a set of Remote System's access rights to data and/or operations available in a Credential Holder's local operational environment (including, e.g., a Local Client and/or a User Device).

"Remote System Issuer": In addition to any ordinary or customary meaning, is intended to include a Trusted Authority trusted by a User Device that generates, signs, and issues a Remote System Certificate either directly or via a delegate Trusted Authority.

"System Owner": In addition to any ordinary or customary meaning, is intended to include an entity (e.g., a person, a company) that owns and/or manages a Remote System.

"System-level Trusted Authority": In addition to any ordinary or customary meaning, is intended to include a Trusted Authority that the System Owner of a Remote System allows to be trusted by that Remote System and/or by a User Device entitled to authenticate to that Remote System, such as for issuing Credentials and/or Remote System Certificates to be used with that Remote System on behalf of the System Owner. For example, such a Trusted Authority may be managed by the System Owner or by a delegate third party.

"Trusted Authority": In addition to any ordinary or customary meaning, is intended to include an entity that is trusted by a Remote System and/or a User Device.

"User Device": In addition to any ordinary or customary meaning, is intended to include a device containing one or more Credentials, such as but not limited to, a card, fob, tag, key, mobile phone, PC, and so forth.

"EDCH": In addition to any ordinary or customary meaning, is intended to include an Elliptic-curve Diffie-Hellman key agreement protocol or other suitable encryption protocol.

Changes and modifications may be made to the disclosed examples without departing from the scope of the present disclosure. These and other changes or modifications are intended to be included within the scope of the present disclosure, as expressed in the following claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separate example.

26

What is claimed is:
1. A method comprising:
establishing a secure channel between a first device and a second device using a system specific trusted authority;
transmitting a first message comprising a first certificate associated with the second device using a first shared secret;
determining, by the first device, using the first certificate, a first set of access rights of the second device;
in response to successfully checking the first certificate, generating a second message comprising a credential associated with the first device using second and third shared secrets, the second shared secret being generated based on a static public key and an ephemeral private key, the third shared secret being generated based on the static public key and a static private key;
transmitting the second message from the first device to the second device, the credential comprising a request for both accessing an online service using a single sign-on process and accessing a physical protected resource associated with the second device; and
determining, by the second device, using the credential, a second set of access rights of the first device.
2. The method of claim 1, further comprising:
authorizing the first device to access one or more resources available in at least one of a local environment of the first device or the second device; and
authorizing the second device to access the one or more resources available in the local environment of the first device.
3. The method of claim 2, the authorizing of the first device and the second device being performed based on the first certificate and the credential, and wherein the system specific trusted authority comprises a trusted authority that a system owner of the second device allows to be trusted by the second device and by the first device entitled to authenticate to that second device.
4. The method of claim 2, wherein the first certificate comprises a remote system certificate comprising a public key certificate for the second device, signed by a trusted remote system issuer, and wherein the first certificate comprises the first set of access rights.
5. The method of claim 2, wherein the one or more resources available in at least one of the local environment of the first device or the second device comprise at least one of data or a set of operations available in the local environment of the first device.
6. The method of claim 2, wherein the one or more resources available in the local environment of the first device comprise a secure file and a physical component.
7. The method of claim 2, wherein the credential authorizes the first device to perform logical access control operations and physical access control operations.
8. The method of claim 1, wherein the secure channel is established based on public key mutual authentication, further comprising checking, by the second device, the credential using one or more trusted authorities of a list of trusted authorities, the first device and second devices being authorized to access one or more resources in response to successfully checking the first certificate and successfully checking the credential.
9. The method of claim 8, wherein the first and second device are authorized only via the first and second trusted authorities.
10. The method of claim 1, wherein the first certificate is signed by a first trusted authority associated with the system specific trusted authority and the credential is signed by a second trusted authority associated with the system specific trusted authority.

11. The method of claim 1, wherein the first certificate comprises system specific custom payloads that correspond to a payload interface of the first device, the specific custom payloads comprising information that encodes the first set of access rights.

12. The method of claim 1, wherein the credential comprises system specific custom payloads that correspond to a payload interface of the second device, the specific custom payloads comprising information that encodes the second set of access rights.

13. The method of claim 1, further comprising checking by the second device, using the credential, whether the first device is authorized to access one or more resources available in a local environment of the first device.

14. The method of claim 1, further comprising:
establishing an additional secure channel between a local device and the first device; and
authorizing the first device or the local device to access one or more resources available in a local environment of the first device, wherein the additional secure channel comprises a short-range communications channel, and wherein the secure channel established between the first device and the second device comprises a long-range communications channel.

15. The method of claim 1, further comprising:
retrieving and accessing the first certificate and the credential as customizable plugins.

16. The method of claim 1, further comprising:
storing on the first device a first static keypair comprising a first static private key and a first static public key;
temporarily storing on the first device a first ephemeral keypair comprising a first ephemeral private key and a first ephemeral public key;
storing the credential on the first device;
storing a first list of trusted authorities on the first device;
storing on the second device a second static keypair comprising a second static private key and a second static public key;
temporarily storing on the second device a second ephemeral keypair comprising a second ephemeral private key and a second ephemeral public key;
storing the first certificate on the second device; and
storing a second list of trusted authorities on the second device.

17. The method of claim 16, further comprising:
exchanging the first and second ephemeral public keys between the first and second devices;
generating, by the first device, the first shared secret based on the first ephemeral private key and the second ephemeral public key;
generating, by the second device, the first shared secret based on the second ephemeral private key and the first ephemeral public key;
transmitting a first message comprising the first certificate using the first shared secret;
checking, by the first device, the first certificate using one or more trusted authorities of the first list of trusted authorities;

checking, by the second device, the credential using one or more trusted authorities of the second list of trusted authorities, the first device and second devices being authorized to access one or more resources in response to successfully checking the first certificate and successfully checking the credential.

18. A system comprising:
one or more processors coupled to a memory comprising non-transitory computer instructions that, when executed by the one or more processors, cause the one or more processors to perform operations comprising:
establishing a secure channel between a first device and a second device using a system specific trusted authority;
transmitting a first message comprising a first certificate associated with the second device using a first shared secret;
determining, by the first device, using the first certificate, a first set of access rights of the second device;
in response to successfully checking the first certificate, generating a second message comprising a credential associated with the first device using second and third shared secrets, the second shared secret being generated based on a static public key and an ephemeral private key, the third shared secret being generated based on the static public key and a static private key;
transmitting the second message from the first device to the second device, the credential comprising a request for both accessing an online service using a single sign-on process and accessing a physical protected resource associated with the second device; and
determining, by the second device, using the credential, a second set of access rights of the first device.

19. A non-transitory computer readable medium comprising non-transitory computer-readable instructions that, when executed by one or more processors, configure the one or more processors to perform operations comprising:
establishing a secure channel between a first device and a second device using a system specific trusted authority;
transmitting a first message comprising a first certificate associated with the second device using a first shared secret;
determining, by the first device, using the first certificate, a first set of access rights of the second device;
in response to successfully checking the first certificate, generating a second message comprising a credential associated with the first device using second and third shared secrets, the second shared secret being generated based on a static public key and an ephemeral private key, the third shared secret being generated based on the static public key and a static private key;
transmitting the second message from the first device to the second device, the credential comprising a request for both accessing an online service using a single sign-on process and accessing a physical protected resource associated with the second device; and
determining, by the second device, using the credential, a second set of access rights of the first device.

* * * * *